(12) United States Patent
Kim et al.

(10) Patent No.: US 7,185,134 B2
(45) Date of Patent: Feb. 27, 2007

(54) APPARATUS FOR MANAGING ETHERNET PHYSICAL LAYER REGISTERS USING EXTERNAL BUS INTERFACE AND METHOD THEREOF

(75) Inventors: Daeub Kim, Daejeon (KR); Bheom Soon Joo, Daejeon (KR); Hae Won Jung, Daejeon (KR); Hyeong Ho Lee, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 342 days.

(21) Appl. No.: 10/704,020

(22) Filed: Nov. 6, 2003

(65) Prior Publication Data

US 2004/0103198 A1    May 27, 2004

(30) Foreign Application Priority Data

Nov. 27, 2002 (KR) .................... 10-2002-0074463

(51) Int. Cl.
*G06F 13/20* (2006.01)
*G06F 13/36* (2006.01)
*G06F 13/14* (2006.01)
*G06F 3/00* (2006.01)

(52) U.S. Cl. .................... 710/313; 710/315; 710/305; 710/8; 710/11

(58) Field of Classification Search .............. 710/8, 710/10–11, 65, 71–72, 104–106, 305–306, 710/310, 313, 315; 709/221–222, 236
See application file for complete search history.

(56) References Cited

U.S. PATENT DOCUMENTS

| | | | |
|---|---|---|---|
| 5,946,462 A * | 8/1999 | Rangan et al. ................ 714/49 |
| 5,978,853 A | 11/1999 | Crayford et al. |
| 6,011,799 A | 1/2000 | Kerstein et al. |
| 6,065,073 A | 5/2000 | Booth |
| 6,215,816 B1 * | 4/2001 | Gillespie et al. ............ 375/219 |
| 6,813,651 B1 * | 11/2004 | Smith et al. .................. 710/20 |
| 6,826,658 B1 * | 11/2004 | Gaither et al. .............. 711/150 |
| 6,842,034 B1 * | 1/2005 | Chan et al. ..................... 326/8 |
| 6,859,825 B1 * | 2/2005 | Williams ..................... 709/220 |
| 6,937,571 B1 * | 8/2005 | Acharya et al. ............ 370/246 |
| 6,975,637 B1 * | 12/2005 | Lenell ........................ 370/412 |
| 2002/0046267 A1 * | 4/2002 | Andra et al. ................ 709/220 |

OTHER PUBLICATIONS

2002 IEEE; Management Data Input/Output (MDIO) Interface, May 1, 2002.

* cited by examiner

*Primary Examiner*—Mark H. Rinehart
*Assistant Examiner*—Thomas J. Cleary
(74) *Attorney, Agent, or Firm*—Blakely Sokoloff Taylor & Zafman

(57) ABSTRACT

An apparatus for managing Ethernet physical layer registers and a method thereof are provided. The apparatus comprises a central processing unit (CPU) with an external bus interface function, and an interface conversion unit which is connected to the CPU through the external bus interface, converts the external bus interface into management data input/output (MDIO) interface and performs communications with the physical layer apparatus.

5 Claims, 9 Drawing Sheets

PRIOR ART

FIG. 2

201 — MANAGEMENT FRAME FOR DIRECT REGISTER ACCESS

| Preamble (32bits) | Start of Frame (2bits) | Operation code (2bits) | Phy Address (5bits) | Register Address (5bits) | Turn-around (2bits) | DATA (16bits) | Idle |

202 — MANAGEMENT FRAME FOR INDIRECT REGISTER ACCESS

| Preamble (32bits) | Start of Frame (2bits) | Operation code (2bits) | Phy Address (5bits) | Device Address (5bits) | Turn-around (2bits) | Address/DATA (16bits) | Idle |

PRIOR ART

APPARATUS FOR MANAGING ETHERNET PHYSICAL LAYER REGISTERS USING EXTERNAL BUS INTERFACE AND METHOD THEREOF

This application claims priority from Korean Patent Application No. 02-74463, filed Nov. 27, 2002, the contents of which are incorporated herein by reference in their entirety.

BACKGROUND OF THE INVENTION

1. Field of the Invention

The present invention relates to a management apparatus which in order to manage registers in a physical layer apparatus in an Ethernet system of a giga bps level or higher speed, converts external bus interface into management data input/output (MDIO) interface and communicates data between a control base processor and a physical layer apparatus, and a method for converting the interface.

2. Description of the Related Art

In the prior art, in order to manage registers in a physical layer apparatus in an Ethernet system of a giga bps level speed, a control station processor supporting MDIO interface of a direct access method has been used. In addition, in order to manage registers in a physical layer apparatus in an Ethernet system of an over 10 Gbps level speed, a control processor supporting MDIO interface of an indirect access method is used and through an automatic confirmation process, registers in a physical layer apparatus are managed. In most of other gigabit Ethernet systems or the Ethernet physical layers connected to multiport switches, a control station processor supporting MDIO interface of a direct access method is used and through an automatic confirmation process, state registers of the physical layer apparatus are efficiently managed or addresses are assigned.

FIG. 1 is a diagram of the structure of a register management apparatus of a prior art Ethernet physical layer apparatus of a giga bps level or higher speed. FIG. 1 shows that a control station is formed with a processor supporting MDIO interface and a unit for managing Ethernet physical layer apparatus registers is formed only by the processor control station and the Ethernet physical layer apparatus so that the control station processor directly accesses registers in the Ethernet physical layer apparatus.

FIG. 2 is a frame diagram of an MDIO interface signal of a prior art Ethernet physical layer apparatus of a giga bps level or higher speed. A direct access method management signal frame 201 comprises a 32-bit preamble signal, a 2-bit start of frame (ST) signal indicating the start of a frame, a 2-bit operation code (OP) signal indicating the operation purpose of a management signal frame, a 5-bit physical address (PHYAD) signal indicating a predetermined address in a physical layer, a 5-bit register address (REGAD) signal indicating the register address of a corresponding physical layer, a 2-bit turn around (TA) signal, a 16-bit data area, and an Idle signal. An indirect access method management signal frame 202 comprises a 32-bit preamble signal, a 2-bit ST signal indicating the start of a frame, a 2-bit OP signal indicating the operation purpose of a management signal frame, a 5-bit port address (PA) signal which is added by considering expandability of the Ethernet, a 5-bit device address (DA) signal, a 2-bit TA signal, a 16-bit address/data signal, and an idle signal.

The direct access method management signal frame 201 defines 32 bits of the preamble signal as all 1's, the ST signal as '01', and if the purpose is to read, the OP signal as '10', and if the purpose is to write, the OP signal as '01'. Then, by using the PHYAD signal and REGAD signal, a corresponding register in the physical layer apparatus is accessed, data is transmitted using an independent data area, and the frame 201 is used in an Ethernet system of a less than gigabit transmission speed.

The indirect access method management signal frame defines 32 bits of the preamble signal as all 1's, the ST signal as '00', and if the purpose is to address, the OP signal as '00', if the purpose is to write, as '01', if the purpose is to read, as '11', and if the purpose is to read and increment, as '10'. Then, by using the PA signal, the DA signal, and an address recorded in the address/data area of an address frame, a corresponding register in the physical layer apparatus is accessed. However, since there is no independent data area, immediately after address information is loaded in the address/data area and the address frame is transmitted, data is inserted into the address/data area and a data frame is transmitted. By doing so, data is transmitted and the frame 202 is used in an Ethernet system of a 10 gigabit or higher speed.

FIG. 3 is a timing diagram of a prior art external bus interface signal.

Based on an external bus interface operation clock (EBICLK), the timing diagram of FIG. 3 shows the timings of an address bus signal ADDR(n), a device signal CS for selecting a device to which a corresponding register belongs, a signal R/W* for reading and writing data, an output enable signal OE for a device to which a corresponding register belongs, a signal BLAST to indicate whether or not burst-type transmission of a plurality of addresses is performed, a signal Write Byte Enable (WBE) for controlling to write data in units of bytes, a data bus signal DATA, a signal Par for parity check of communications data, and a signal Err indicating an error of communications data confirmed by the parity check result. In FIG. 3, the frequency of EBICLK can be varied according to a control station processor, and also, the R/W* signal can be allocated to separate signal. In addition, when one address is transmitted in one cycle, BLAST is kept activated until immediately before the communications finishes and then is inactivated. A and B may vary according to a used column of the data bus, and are determined in units of bytes.

In order to manage registers of a physical layer apparatus by using external bus interface instead of MDIO interface, the control station processor should convert the external bus interface into the MDIO interface. The external bus interface comprises a chip select (CS) signal, a clock signal of a 26 MHz~33 MHz or higher frequency, an address bus, a data bus, and a read not write (R/W*) signal, and transmits data in parallel. The MDIO interface comprises a clock signal of a management data clock (MDC) with a maximum frequency of 2.5 MHz and a bidirectional signal MDIO, and transmits data serially through one signal pin. Accordingly, in order to support both interfaces of different types, having a data processing method difference between parallel data processing and serial data processing, and a processing time difference from different frequencies, the control station processor should consider masking of the data bus and address bus and other problems.

However, though in order to manage registers in a physical layer apparatus of an Ethernet system with a giga bps level or higher speed, the control station processor should support the MDIO interface, but it is practically impossible for all control station processors selected by the characteristic of a system to support the MDIO interface.

SUMMARY OF THE INVENTION

The present invention provides an apparatus for managing registers in a physical layer apparatus of an Ethernet system of a giga bps level or higher speed, which manages registers in a physical layer apparatus by using external bus interface of a control station processor in an Ethernet system of a giga bps level or high speed, and an interface conversion method therefor.

According to an aspect of the present invention, there is provided an apparatus for managing registers of an Ethernet physical layer apparatus comprising: a central processing unit (CPU) which has an external bus interface function; and an interface conversion unit which is connected to the CPU through the external bus interface, converts the external bus interface into management data input/output (MDIO) interface and performs communications with the physical layer apparatus.

According to another aspect of the present invention, there is provided a method for managing registers of an Ethernet physical layer apparatus by accessing a CPU of a control station having external bus interface, the method comprising: (a) setting a predetermined mask area in an address bus and a data bus of the external bus interface; (b) based on predetermined control signals transmitted by the CPU and the mask area values, determining a method for accessing the registers of the physical layer apparatus; and (c) by performing communications with the registers of the physical layer apparatus in the method determined in the step (b), performing read/write in the registers of the physical layer apparatus.

BRIEF DESCRIPTION OF THE DRAWINGS

The above objects and advantages of the present invention will become more apparent by describing in detail preferred embodiments thereof with reference to the attached drawings in which:

FIG. 2 is a frame diagram of an MDIO interface signal of a prior art Ethernet physical layer apparatus of a giga bps level or higher speed;

DESCRIPTION OF THE PREFERRED EMBODIMENTS

Figure 1:
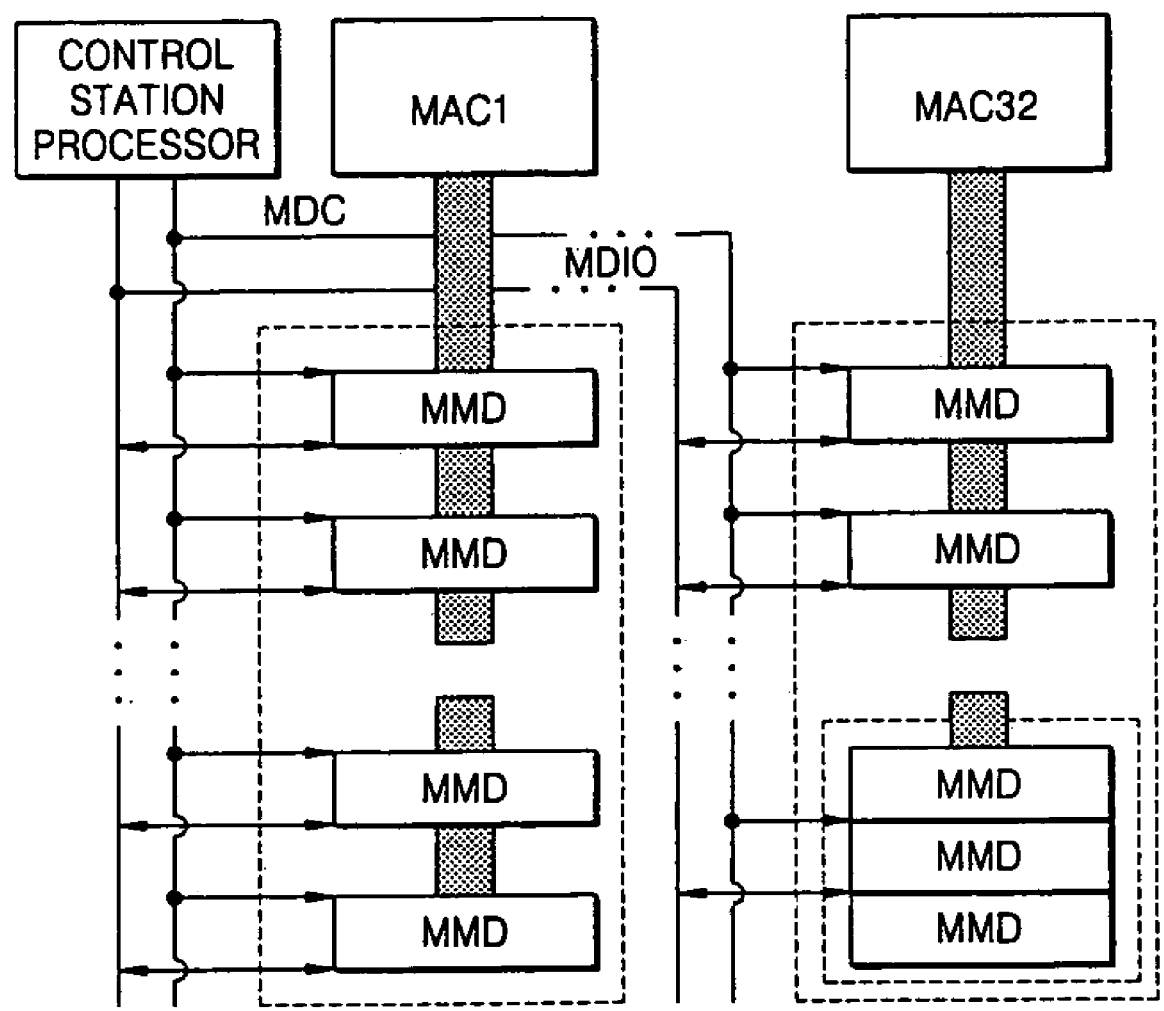
FIG. 1 is a diagram of the structure of a register management apparatus of a prior art Ethernet physical layer apparatus of a giga bps level or higher speed.
Figure 4:
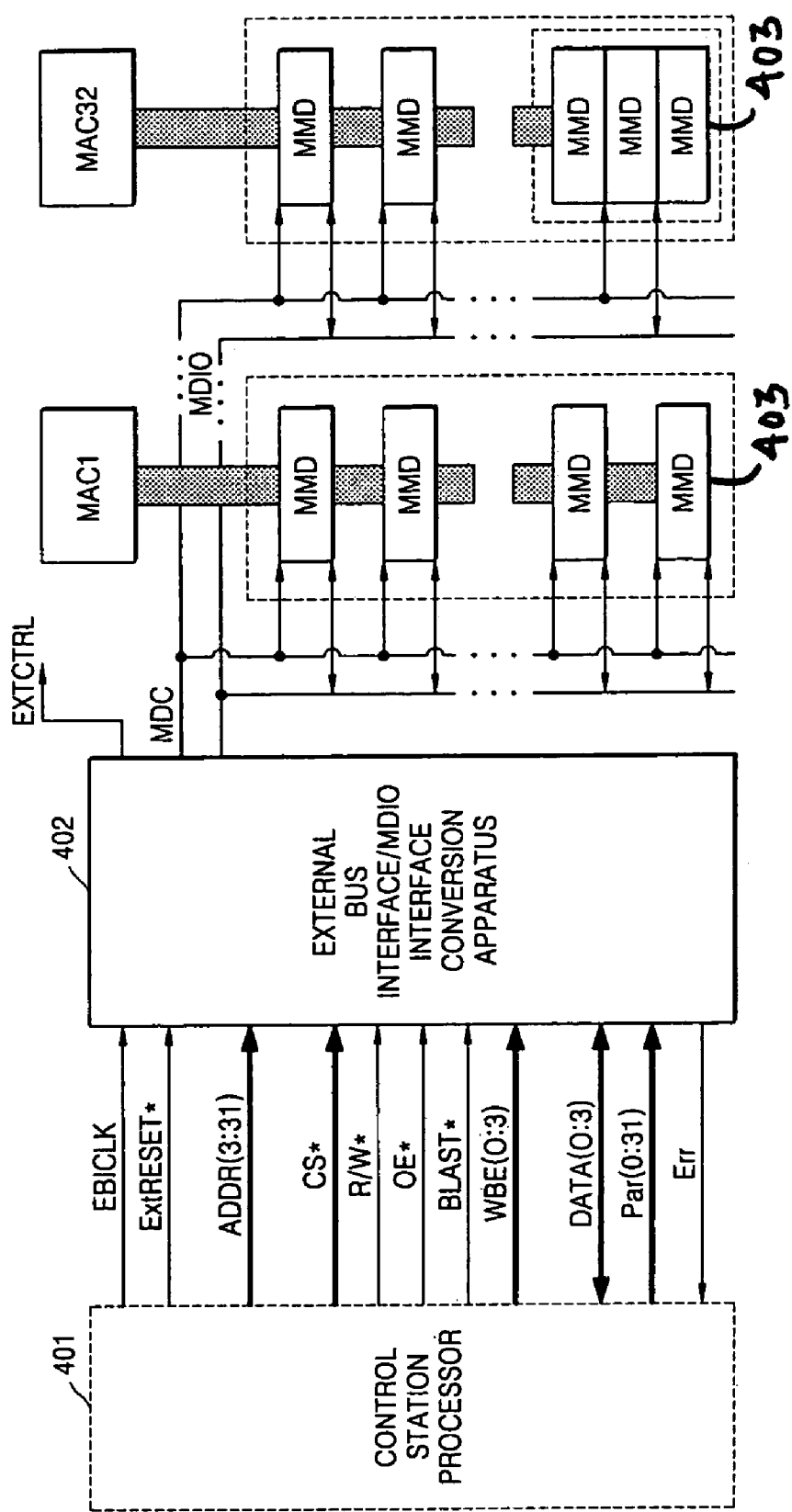
FIG. 4 is a diagram of the structure of an apparatus for managing registers of an Ethernet physical layer apparatus of a giga bps level or higher speed according to the present invention.

FIG. 4 is a diagram of the structure of an apparatus for managing registers of an Ethernet physical layer apparatus of a giga bps level or higher speed according to the present invention. In general, in order to manage MDIO interface, registers in a physical layer apparatus (MMD) 403 of an Ethernet system of a gigabit or higher transmission speed need a control station processor supporting the MDIO communications interface as shown in FIG. 1. However, it is impossible for all control station processors selected considering the characteristic of a system to support the MDIO interface for managing physical layer apparatus registers. Accordingly, it is desirable that an apparatus for managing registers in an Ethernet physical layer apparatus of a gigabit or higher speed is built including an external bus interface/MDIO interface conversion apparatus 402 which makes most control station processors support the MDIO interface through an external bus interface embedded in the processor. If the control station processor has an external bus interface function, the Ethernet physical layer apparatuses 403 of a gigabit or higher speed can be managed.

Figure 5:
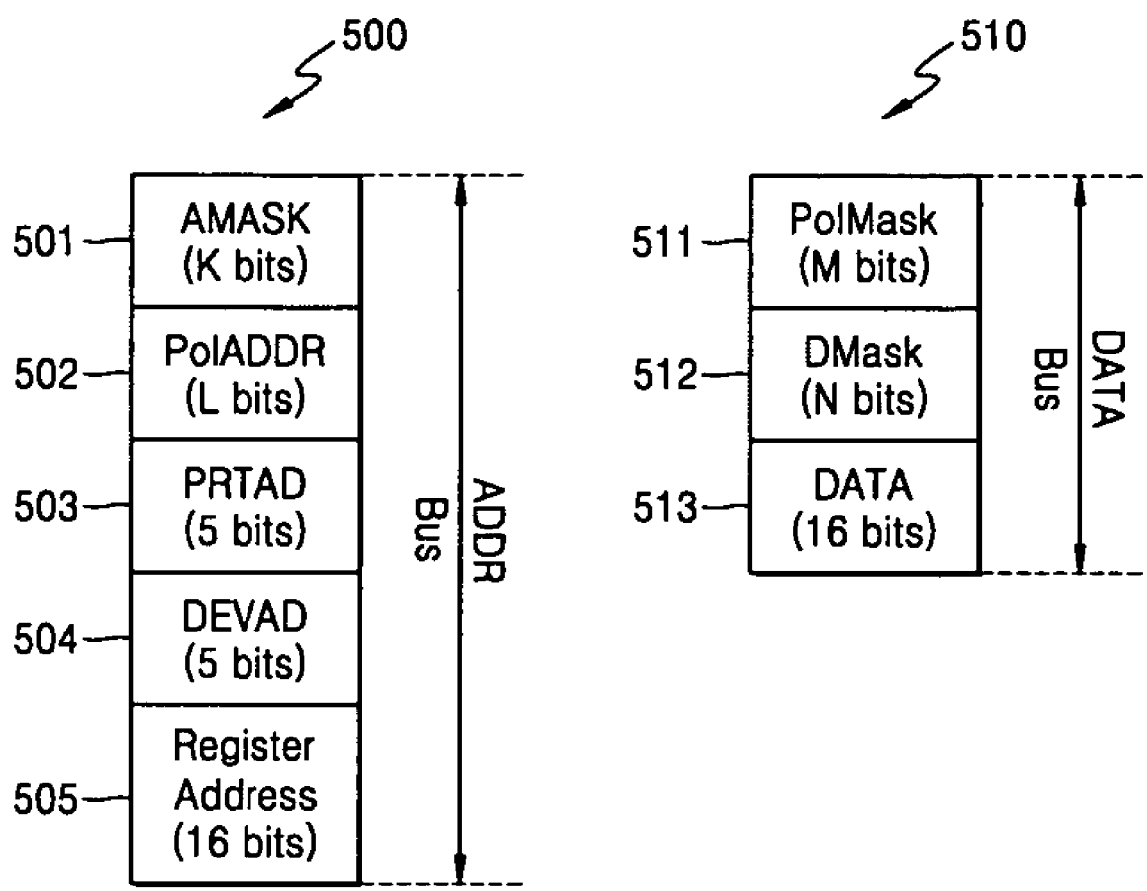
FIG. 5 is a detailed frame diagram of an external bus interface signal sequence according to the present invention.

FIG. 5 is a detailed frame diagram of an external bus interface signal sequence (address bus 500 and data bus 510) improved by the present invention.

The control station processor 401 supports the MDIO interface through the external bus interface and directly manages registers except the Ethernet physical layer apparatus, through the external bus interface. Accordingly, a matching algorithm capable of matching the external bus interface with the MDIO interface should be able to be used, by placing several types of mask areas in the address sequence 500 and the data sequence 510 of the external bus interface. In addition, it should be able to be distinguished whether adjacent registers are directly accessed through the external bus interface or the MDIO is accessed by using the external bus interface/MDIO interface conversion apparatus 402. Referring to FIG. 5, the address sequence 500 of the external interface comprises K bits. The address sequence 500 of the external interface comprises AMASK 501, PolADDR 502, PRTAD 503, DEVAD 504, and Register Address 505. In AMASK 501, data for distinguishing whether it is desired to be connected to the MDIO or to directly access adjacent registers is recorded. PolADDR 502 comprises L bits and includes information for distinguishing whether or not a confirmation job is performed in a matching algorithm. PRTAD 503 comprising 5 bits, is an address capable of distinguishing 32 ports so that maximum 32 ports can be used in 10 gigabit Ethernet, and exists in indirect access method MDIO. DEVAD 504 comprises 5 bits, and is an address capable of distinguishing 32 devices so that 32 separate devices can be used in 10 gigabit Ethernet. Register Address 505 is a register address which allows an MDIO frame arriving at a predetermined port or device, to visit a corresponding register. The data sequence 510 of external interface comprises PolMask 511, DMask 512, and data for communications with the MMD. PolMask 511 comprising M bits, indicates whether or not MDIO write is finished when a matching algorithm job is performed, and is transmitted to a control station processor. DMask 512 comprises N bits and indicates the state of MDIO communications channels and the progress state of write/read jobs. Data for communications with the MMD comprises 16 bits. Here, K, L, M, and N can be arbitrarily set according to design.

Figure 6:
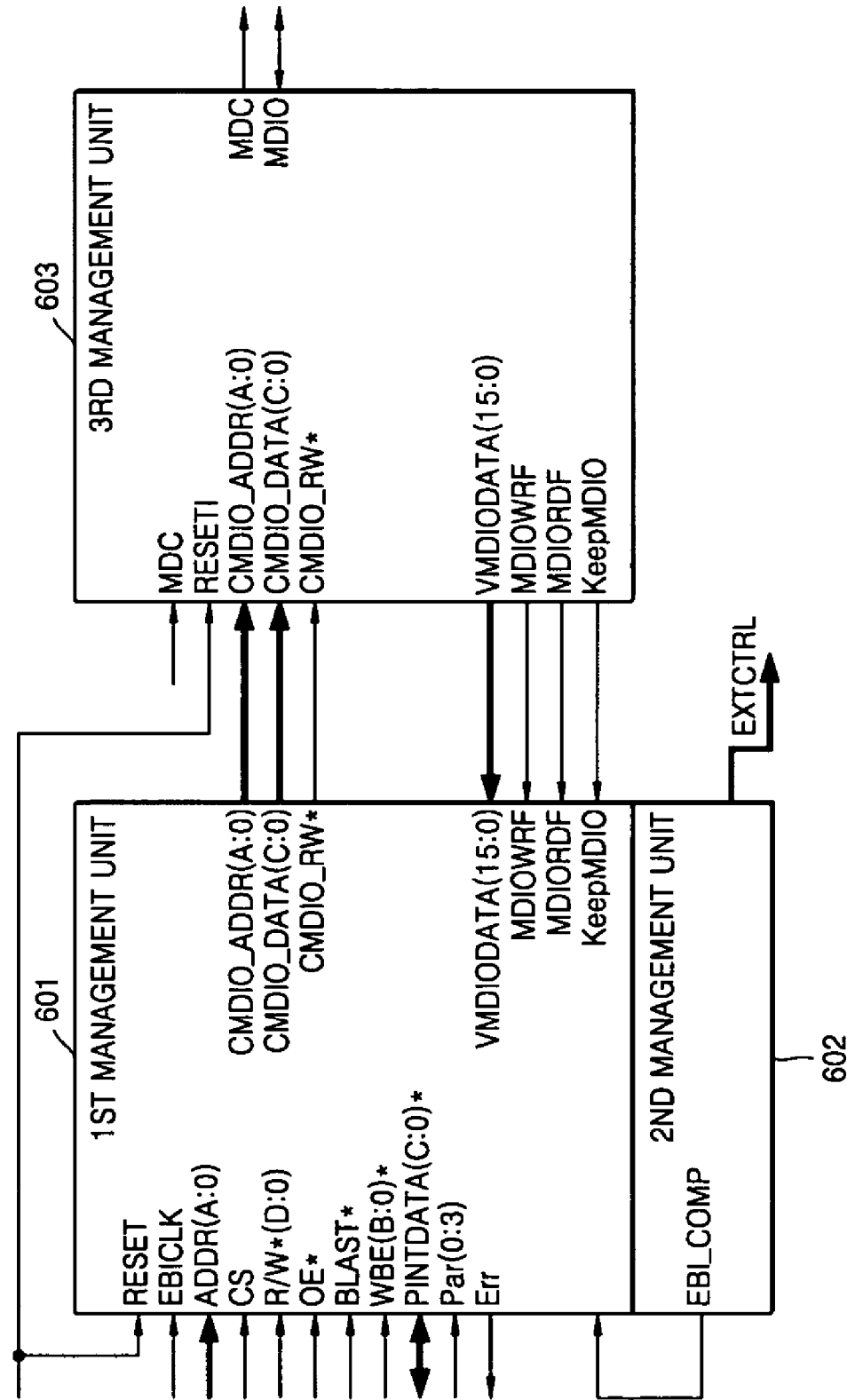
FIG. 6 is a detailed block diagram of an external bus interface/MDIO interface conversion apparatus unit according to the present invention.

FIG. 6 is a block diagram of an external bus interface/MDIO interface conversion apparatus 402 matching the external bus interface of a control station processor with MDIO interface of an Ethernet physical layer apparatus of a gigabit or higher speed according to the present invention.

Figure 3:
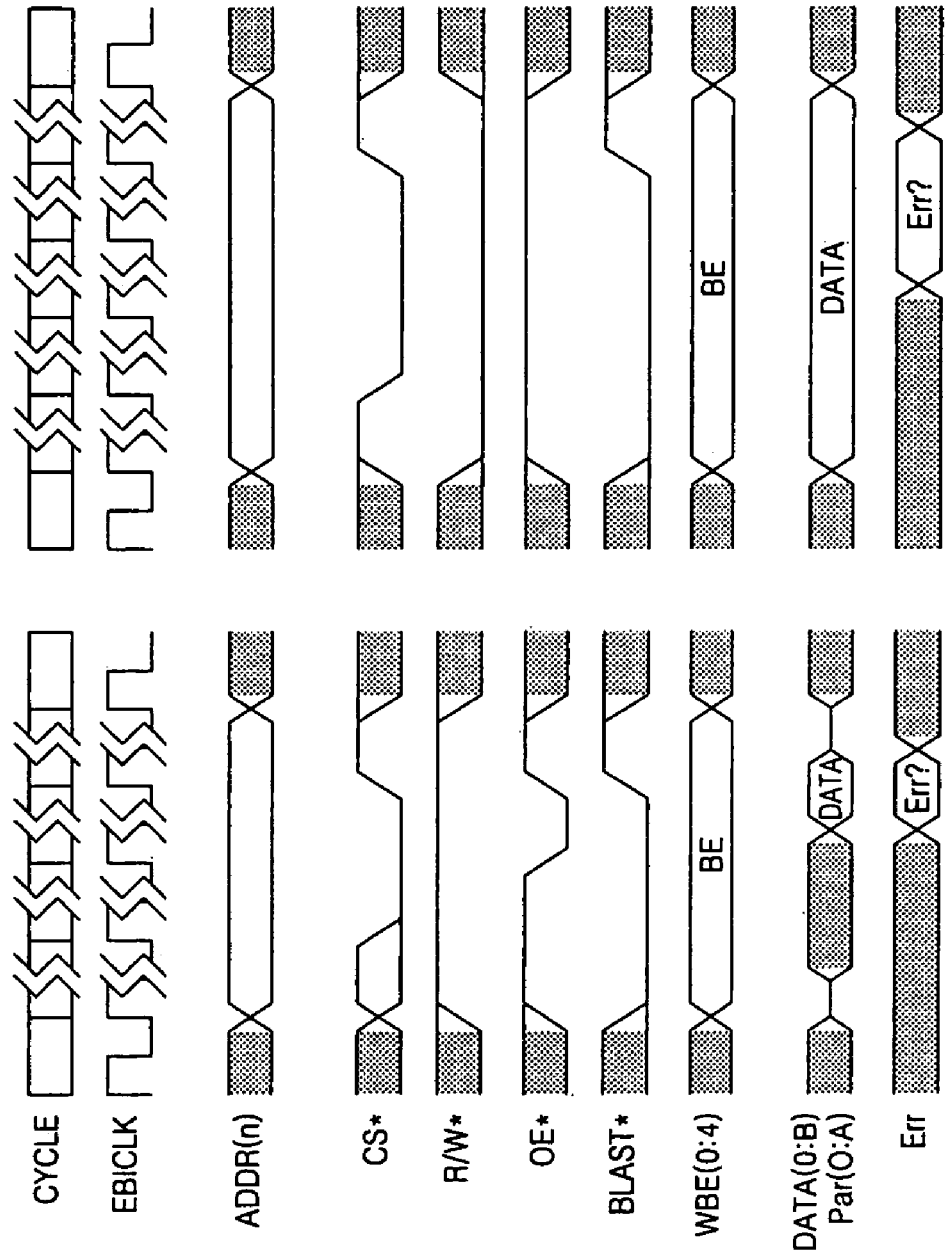
FIG. 3 is a timing diagram of a prior art external bus interface signal.

The external bus interface/MDIO interface conversion apparatus 402 comprises first through third management units 601 through 603. The first management unit 601 generates predetermined signals (CMDIO_ADDR, DMDIO_DATA, CMDIO_RW*; the purposes of theses signals will be explained below) that are needed for MDIO frame conversion in external bus interface, outputs the signals to the third management unit 603, and when a control station processor directly accesses a register of an external apparatus, forms a path to the second management unit 602. That is, the first management unit 601 receives control signals having timings shown in FIG. 3 and an initialization signal (RESET), and with the second management unit 602 that can be directly accessed by the control station processor, the register of the external device can be controlled by EXTCTRL signal. In addition, the second management unit 602 stores information on the register of the external device till the control station processor processes. Meanwhile, if writing data in or reading data from the second management unit 602 is finished, the second management unit 602 provides EBI_COMP signal indicating whether or not reading/writing is correctly performed, to the first management unit 601. After receiving predetermined signals needed in MDIO frame conversion from the first management unit 601, the third management unit 603 generates an MDIO frame, then accesses the physical layer apparatus, and performs reading/writing in the register of the physical layer apparatus.

The content explained above will now be explained in more detail. The first management unit 601 provides information on the MDIO frame (for example, channel state information) to the third management unit 603 so that the external bus interface communication and the MDIO communication can be performed independently. At this time, the first management unit 601 provides information on the MDIO frame to the third management unit 603 through CMDIO_ADDR indicating an address related to MDIO communication, CMDIO_DATA indicating data related to MDIO communication, and CMDIO_RW* indicating read/write mode. CMDIO_ADDR is an address bus which if MDIO channel use, that is, a communication command, is executed, till another MDIO communication command is executed, continuously provides an immediately preceding MDIO address independently of the external bus interface channel. CMDIO_DATA is a data bus which if MDIO channel use, that is, a communication command, is executed, till another MDIO communication command is executed, continuously provides data related to immediately preceding MDIO independently of the external bus interface. After receiving information on the MDIO frame from the first management unit 601, the third management unit 603 generates a direct or indirect access method management signal frame 202 and accesses the register of the corresponding MMD. In addition, the third management unit 603 loads MDIOWRF indicating that MDIO write communication is correctly finished, MDIORDF indicating that MDIO read communication is correctly finished, KeepMDIO indicating whether or not MDIO communication is in process, and data information read from the MMD, on VMDIODATA (15:0) and transmits to the first management unit 601.

Figure 7:
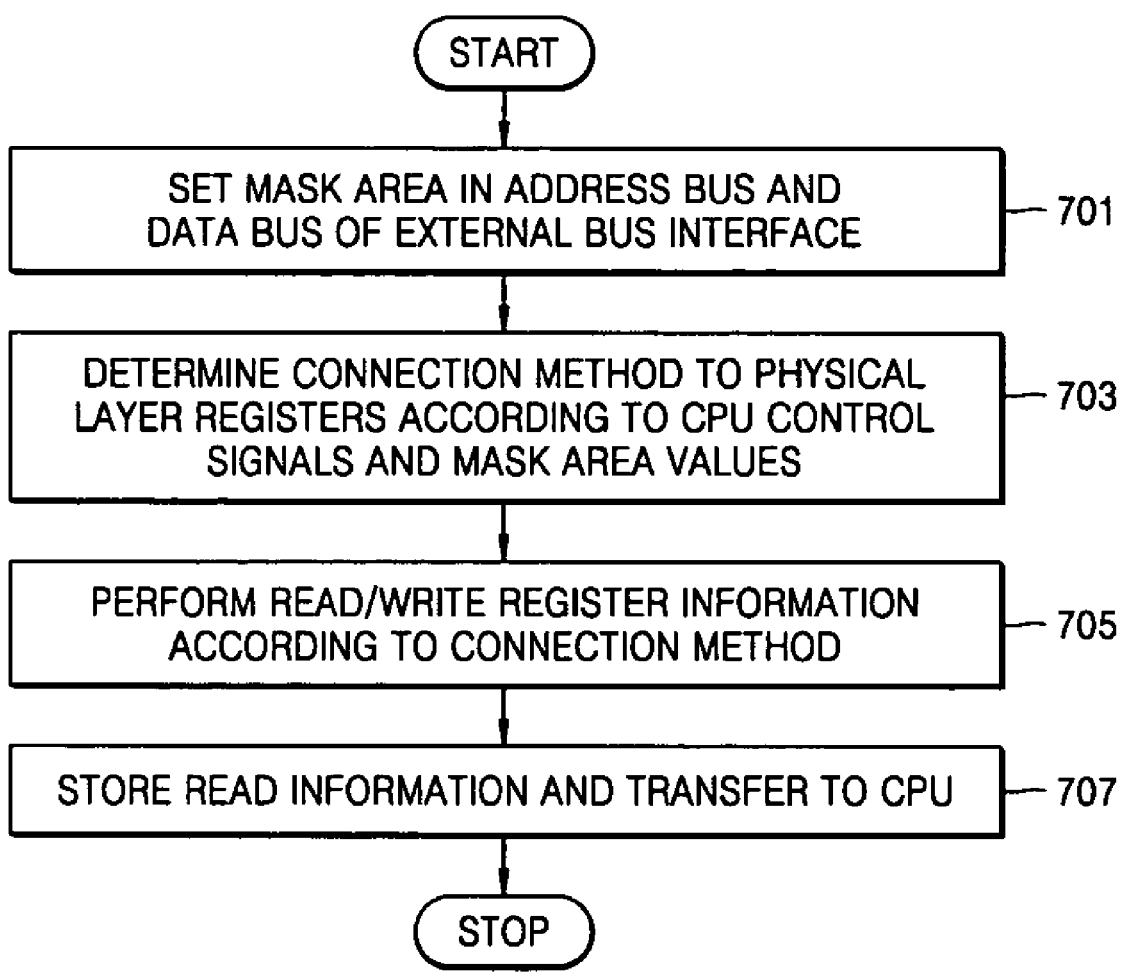
FIG. 7 is a flowchart of the steps performed by an interface conversion method according to the present invention.
Figure 8:
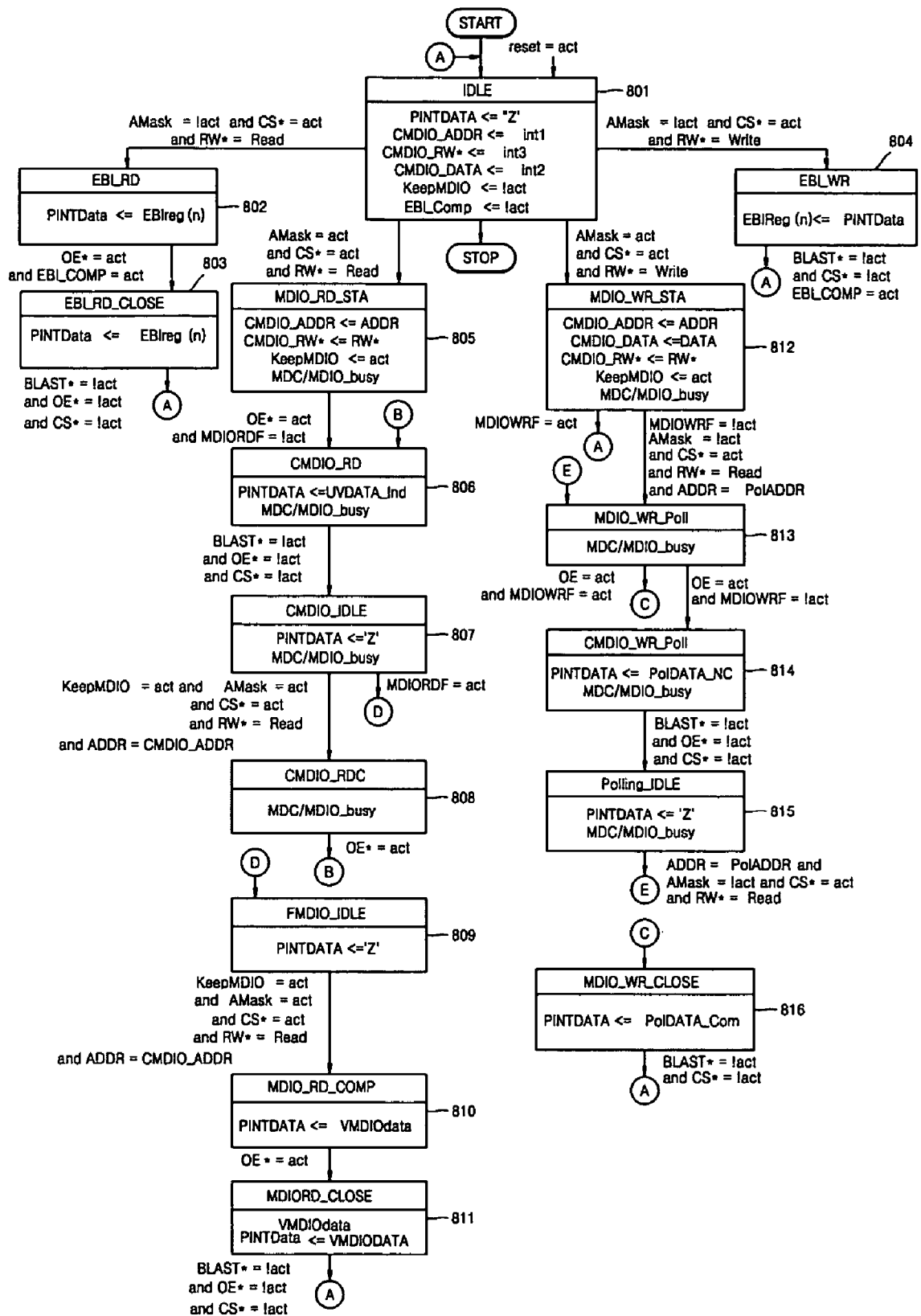
FIG. 8 is a flowchart of the steps performed by a preferred embodiment of an interface conversion method according to the present invention.

FIG. 7 is a flowchart of the steps performed by an interface conversion method according to the present invention, and FIG. 8 is a detailed flowchart of the steps performed by an interface conversion method according to the present invention.

First, a predetermined mask area is set in the address bus and data bus of an external bus interface in step 701. The role of each field of these buses is the same as described above. Next, the external bus interface/MDIO interface conversion apparatus 402 determines a method for accessing registers of the physical layer apparatus based on a variety of control signals as shown in FIG. 6 and mask area values from the control station processor having the external bus interface. That is, it is determined whether the management frame as shown in FIG. 2 is formed or the registers of the external apparatus is to be accessed directly through the external bus interface in order to access the registers of the physical layer apparatus by a direct/indirect access method in step 703. Based on the determined method, the external bus interface/MDIO interface conversion apparatus 402 performs reading/writing in the registers of the physical layer apparatus by performing communications with each register in step 705, and then transmits the information to the control station processor or receives the information from the control station processor in step 707.

Referring to FIG. 8, the conversion method between the external bus interface and the MDIO interface shown in FIG. 7 will now be explained in detail.

Referring to FIG. 8, IDLE state 801 is an initial state where the system is reset and initialized, or which is recovered when all communications are completed. In the IDLE state 801, a data bus loading PINTDATA that is a parallel signal sequence input and output through the external bus interface is set to a high impedance state, CMDI_ADDR is set to an initial value (Int1) determined by an administrator, CMDIO_DATA is set to an initial value (Int2) determined by the administrator, CMDIO_RW* is set to an initial value (Int3) determined by the administrator, and KEEPMDIO and EBI_COMP are set to an inactive state. Here, act indicates an active state, and Iact indicates an inactive state. In the IDLE state 801, the external bus interface/MDIO interface conversion apparatus 402 operates in the following four types according to communication mode.

First, the external bus interface/MDIO interface conversion apparatus 402 operates in read operation mode 802 of external interface communications irrelevant to MDIO communications. In this case, in the IDLE state 801, AMASK becomes an inactive state and CS* is in an active state. In addition, if RW* is in read mode, the apparatus 402 enters in EBI_RD state 802 and reads PINTDATA. Also, if in the EBI_RD state, OE* is in an active state and EBI_COMP becomes an active state, the apparatus 402 enters the EBI_RD_CLOSE state 803 and outputs PINTDATA. In addition, if in EBI_RD_CLOSE state 803, BLAST*, OE*, and CS* become all inactivate states, the apparatus enters into the IDLE state 801 that is the initial state.

Secondly, the external bus interface/MDIO interface conversion apparatus 402 operates in write operation mode 804 of external interface communications irrelevant to MDIO communications. In this case, in the IDLE state 801, AMASK becomes an inactive state and CS* is in an active state. In addition, if RW* is in write mode, the apparatus 402 enters in EBI_WR state 804 and writes PINTDATA. In addition, if in the EBI_WR state 804, BLAST* and CS* become inactive states and EBI_COMP becomes an active state, the apparatus 402 enters into the IDLE state 801 that is the initial state.

Thirdly, the external bus interface/MDIO interface conversion apparatus 402 operates in read operation mode of MDIO communications through the external bus interface communications. In this case, in the IDLE state 801, AMASK becomes an active state and CS* is in an active state. In addition, if RW* is in read mode, the apparatus 402 enters into MDIO_RD_STA state 805 that is an initial state for the MDIO read operation, stores executing address ADDR in CMDIO_ADDR, sets CMDIO_RW* to read mode, KeepMDIO to an active state, writes information indicating that MDIO communication is in process, in DMASK 504, generates an MDIO frame, and begins MDIO communications. If in MDIO_RD_STA state 805, OE* becomes an active state, data is transmitted to the control station processor through the external bus interface. However, if MDIORDF becomes an inactive state because MDIO read communication cannot be completed in one cycle of the external bus interface communication due to the difference between a high speed parallel transmission method and a low speed serial transmission method, the apparatus 402 enters into CMDIO_RD state 805, writes information indicating that MDIO communication is in process, in DMASK 504, and continues the MDIO communication. In CMDIO_RD state 805, if PINTDATA is not valid (UVDATA) and BLAST*, OE*, and CS* become all inactive states by the control station processor, the apparatus 402 enters into CMDIO_IDLE state 807, sets the data bus for external bus interface communications to a high impedance state, and continues the MDIO communication. Then, if in CMDIO_IDLE state 807, MDIORDF becomes an active state, in order to send data read from a corresponding register of the MMD to the control station processor, the apparatus 402 enters into FMDIO_IDLE state 809 that is a ready state for external bus interface communication of the last one cycle, and sets the data bus for external bus interface communications to a high impedance state. In addition, if while MDIORDF is in an inactive state, another cycle of the external bus interface communications begins again, that is, if AMASK becomes an active state, and if KeepMDIO is in an active state, CS* is in an active state, RW* is in read mode, and ADDR is the same as CMDIO_ADDR, the apparatus enters into CMDIO_RDC state 808, and continues the MDIO communications in process, till a correct register value is read from the MMD. If in the CMDIO_RDC state 808, in order for the control station processor to read data read through the MDIO communications, OE* is made to be in an active state, the apparatus 402 again enters into CMDIO_RD state, and repeats the states of the CMDIO_IDLE 807, CMDIO_RDC 808, and CMDIO_RD 806 till the MDIORDF becomes an active state. In FMDIO_IDLE state 809, AMASK and KeepMDIO are in activate states and CS* becomes an active state. In addition, if RW* is in read mode and ADDR is the same as CMDIO_ADDR, the apparatus. 402 enters into MDIO_RD_COMP state 810, and by putting a mark indicating valid information on VMDIODATA that is valid data read through the MDIO communications and on DMASK, generates a frame. In addition, if in MDIO_RD_COMP state 810, OE* becomes an active state, the apparatus 402 enters into MDIORD_CLOSE state 811 and outputs VDMIO-DATA and DMask information as PINTDATA. In addition, if in MDIO_RD_CLOSE state 811, BLAST*, OE*, and CS* become all inactive states, the apparatus enters into the IDLE state 801 that is the initial state.

Fourthly, the external bus interface/MDIO interface conversion apparatus 402 operates in write operation mode of MDIO communications through external bus interface communications. In this case, in the IDLE state 801, AMASK becomes an active state and CS* is in an activate state. Then, if RW* is in write mode, the apparatus enters into MDIO_WR_STA state 812 that is an initial state for the MDIO write operation, and stores executing address ADDR in CMDIO_ADDR. In addition, the apparatus stores executing data in CMDIO_DATA, sets CMDIO_RW* to write mode, and sets KeepMDIO to an active state.

In addition, the apparatus 402 writes information indicating that MDIO communication is in process, in DMASK 504, generates an MDIO frame, and begins MDIO communications. If in MDIO_WR_STA state 812, MDIOWRF becomes an active state, the apparatus enters into IDLE state. At this time, since the difference between the processing time of the external bus interface communications and the processing time of the MDIO communications is big due to the difference between the high speed parallel transmission method and the low speed serial transmission method, if the external bus interface communication channel is empty for a long while, the MDIO write communication can be completed immediately. Meanwhile, if MDIOWRT is in an inactive state, AMASK is in an inactive state, CS* is in an active state, RW* is in read mode, and ADDR is the same as PolADDR that is an address for confirming that write job is completed, the apparatus enters into MDIO_WR_Poll state 813 and continues MDIO communications. If in MDIO_WR_Poll state 813, MDIOWRF becomes an active state and OE* becomes an active state, the apparatus enters into MDIO_WR_CLOSE state 816. In addition, PollMask 503 indicating that the MDIO write communication is finished is set to Valid and output to the control station processor through PINTDATA. If BLAST* and CS* become all inactive states, the apparatus enters into the IDLE state 801 that is the initial state, and if MDIOWRF is in an inactive state and OE* is in an active state, enters into CMDIO_WR_Poll state 813. Then, in order to inform the control station processor that the MDIO write job into DATA is not finished, a mark indicating that data is not value (NV) is made in PolMask, and information indicating that MDIO communication is in process is written in DMASK 504 and output and the confirmation job is continuously performed. If in CMDIO_WR_Poll state 814, BLAST*, OE*, and CS* become all inactive states, the apparatus enters into Polling_IDLE state 815. Then, the apparatus sets the data bus for external bus interface communications to a high impedance state and continues the MDIO communications. If in Polling_IDLE state 815, another cycle of the external bus interface communications begins again, that is, if AMASK becomes an inactive state, CS* becomes an active state and RW* is in read mode. Then, if ADDR is the same as PolADDR, the apparatus again enters into MDIO_WR_Poll state 813 and repeats the states of CMDIO_WR_Poll 814, Polling_IDLE 815, and MDIO_WR_Poll 813, till MDIO-WRF becomes an active state.

Figure 9:
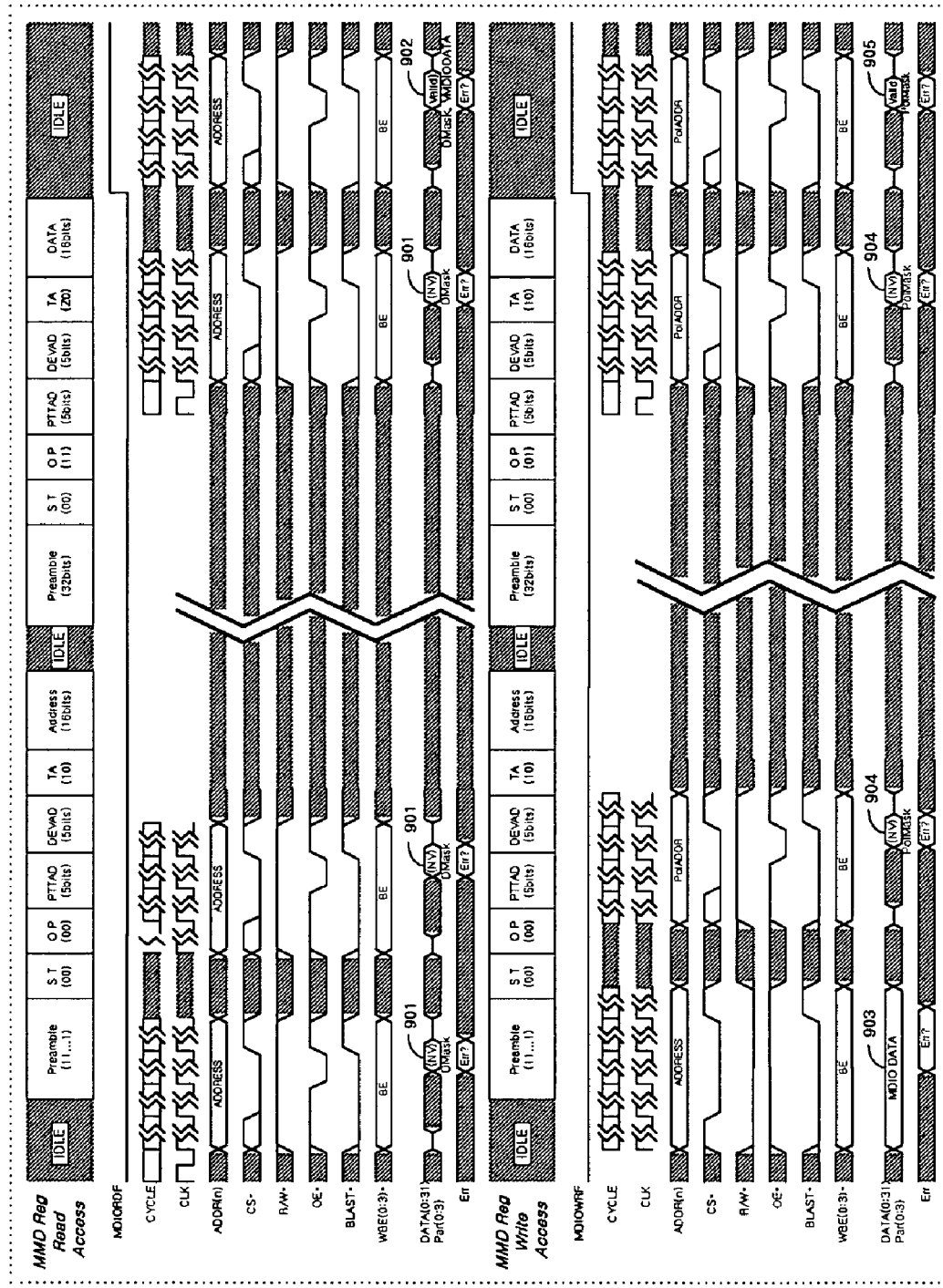
FIG. 9 is a timing diagram of major signals in external bus interface according to register read/write of an Ethernet physical layer apparatus according to the present invention.

FIG. 9 is a timing diagram of major signals in external bus interface according to register read/write of an Ethernet physical layer apparatus according to the present invention. FIG. 9 shows major signal input timings of the external bus interface communication unit, major signal output timings of the MDIO communication unit, and the states of control signals.

If the control station processor transmits the MDIO read command through the external bus interface, when CS* becomes an active state according to the state flow of FIG. 8, the external bus interface/MDIO interface conversion apparatus 402 generates the MDIO frame and begins the output of the MDIO frame. In addition, by transmitting information indicating not valid (NV) and that communication is in process, on DMask interval 512 of the data sequence 901 till MDIORDF becomes an active state that is logic level 1, the apparatus 402 makes the control station processor repeatedly access an identical address till the control station processor obtains correct MDIO information. If MDIORDF becomes an active state, the data sequence 902 containing correct MDIO information is sent to the control station processor and a series of the processes is finished.

Likewise, if the control station processor transmits the MDIO write command through the external bus interface, when CS* becomes an active state according to the state flow of FIG. 8, the external bus interface/MDIO interface conversion apparatus 402 generates the MDIO frame and begins the output of the MDIO frame. In addition, by transmitting information (NV; Not Valid) indicating that write is not finished, on PolMask interval 511 of the data sequence 904, till MDIOWRF becomes an active state that is logic level 1, the apparatus 402 makes the control station processor repeatedly access an identical address till the control station processor obtains correct MDIO information. If MDIOWRF becomes an active state, information indicating that write is finished is loaded on the PollMask interval 511 of the data sequence 905 and sent, and a series of the processes is finished.

The present invention may be embodied in a code, which can be read by a computer, on a computer readable recording medium. The computer readable recording medium includes all kinds of recording apparatuses on which computer readable data are stored. The computer readable recording media includes storage media such as magnetic storage media (e.g., ROM's, floppy disks, hard disks, etc.), optically readable media (e.g., CD-ROMs, DVDs, etc.) and carrier waves (e.g., transmissions over the Internet). Also, the computer readable recording media can be scattered on computer systems connected through a network and can store and execute a computer readable code in a distributed mode.

As described above, the apparatus for managing registers in a physical layer apparatus and the interface conversion method according to the present invention form a register management apparatus of an Ethernet physical layer apparatus of a giga bps level or higher speed. Accordingly, when a control station processor is selected in an Ethernet system of a giga bps level or higher speed, whether or not MDIO interface for managing registers in the physical layer apparatus is supported is not considered and only by considering the characteristic of the system, the processor can be selected such that the range of selection of applicable processors is widened and with competitiveness, a system can be implemented.

What is claimed is:

1. A method for managing registers of an Ethernet physical layer apparatus by an apparatus which connects the Ethernet physical layer apparatus and a CPU of a control station having an external bus interface, the method comprising:
   (a) setting a first mask area in an address bus and a second mask area in a data bus of the external bus interface;
   (b) based on control signals transmitted by the CPU and values of the first mask area and the second mask area, determining whether the registers of the physical layer apparatus are to be accessed using a management data input/output (MDIO) interface or the external bus interface; and
   (c) by performing communications with the registers of the physical layer apparatus in accordance with the step (b), performing a read or a write in the registers of the physical layer apparatus.

2. The method of claim 1, wherein the step (a) comprises: generating an address bus structure having a first mask unit and a first address unit, wherein the first mask unit is for determining an access method of the registers of the physical layer apparatus, and the first address unit is for distinguishing whether or not an write is completed.

3. The method of claim 1, wherein the step (a) comprises: generating a data bus structure having a second mask unit, a third mask unit, and a data unit, wherein the second mask unit is for loading data informing the CPU of the control station whether or not a MDIO write is finished, the third mask unit is for indicating the state of an MDIO communication channel and the state of the write or the read, and the data unit is for loading data communicated with the registers of the physical layer apparatus.

4. The method of claim 1, wherein the step (b) comprises: generating signals needed in a MDIO frame conversion in the external bus interface and then generating a MDIO frame.

5. The method of claim 1, wherein the step (c) comprises: storing register information till an external bus interface management unit transmits the information to the CPU.

* * * * *